F. M. PETERS & W. H. HUNGERFORD.
MACHINE FOR SUBDIVIDING PLASTIC SUBSTANCES.
APPLICATION FILED AUG. 5, 1915.
1,257,523.
Patented Feb. 26, 1918.
7 SHEETS—SHEET 1.
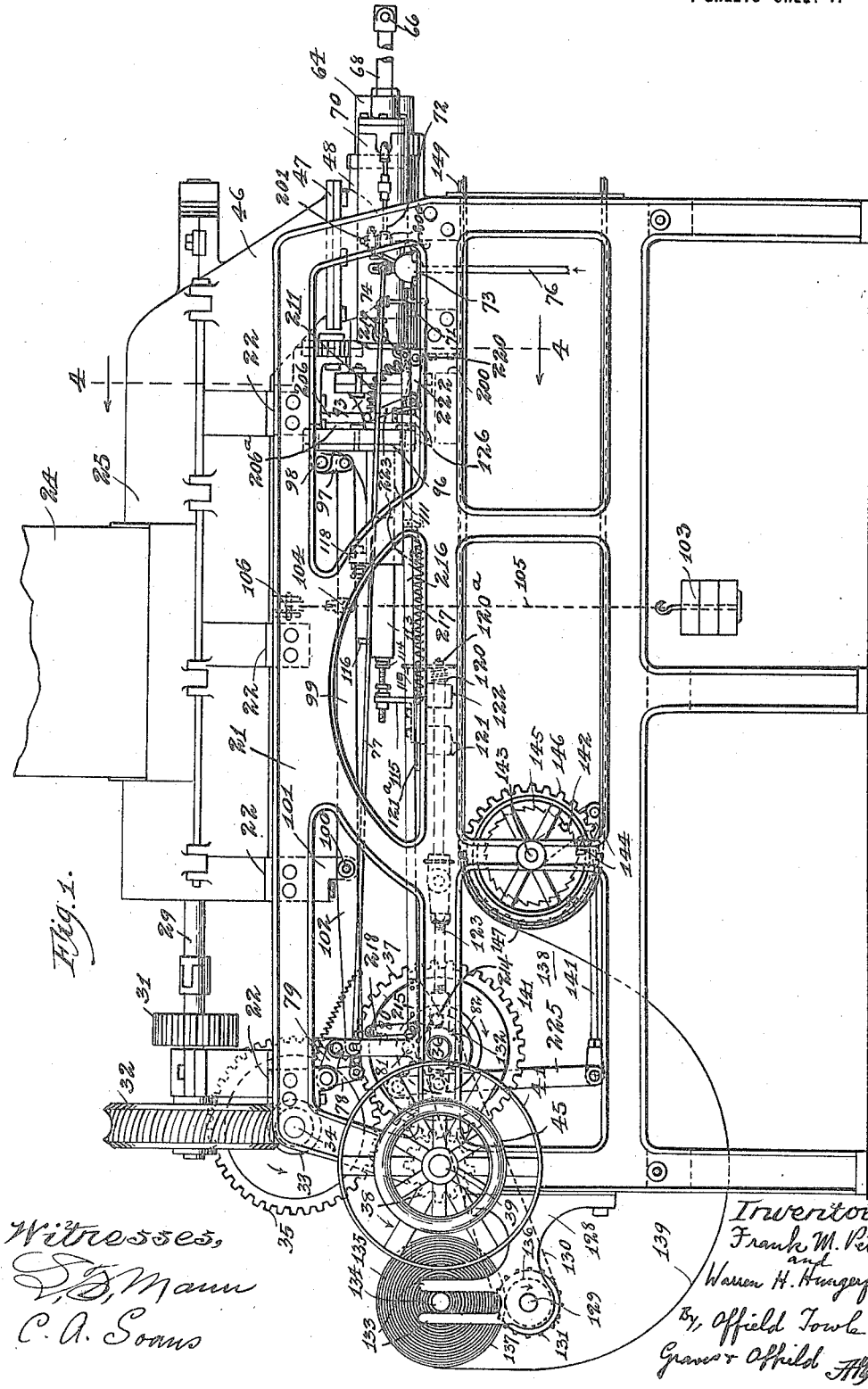

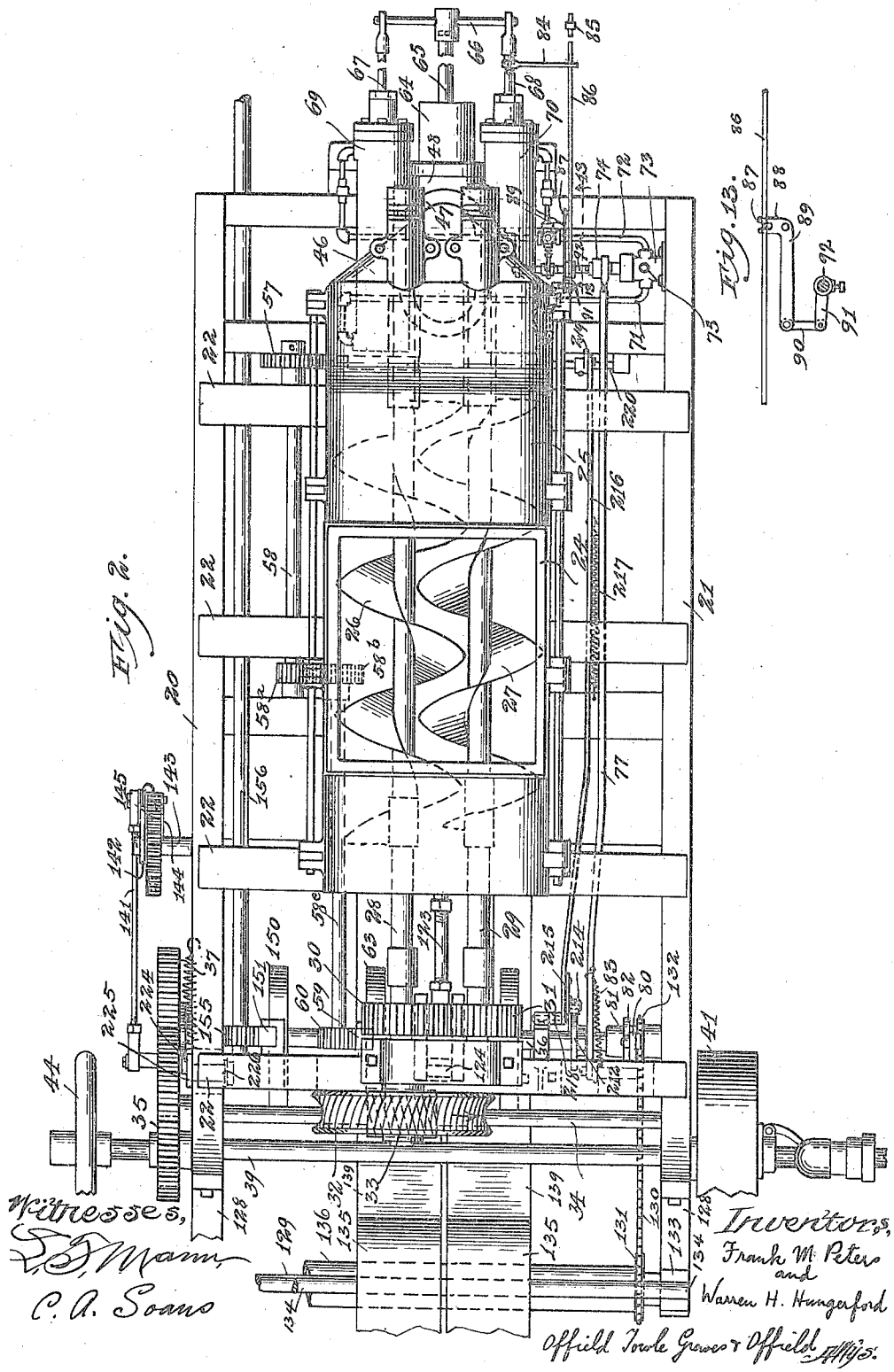

F. M. PETERS & W. H. HUNGERFORD.
MACHINE FOR SUBDIVIDING PLASTIC SUBSTANCES.
APPLICATION FILED AUG. 5, 1915.
1,257,523.
Patented Feb. 26, 1918.
7 SHEETS—SHEET 3.
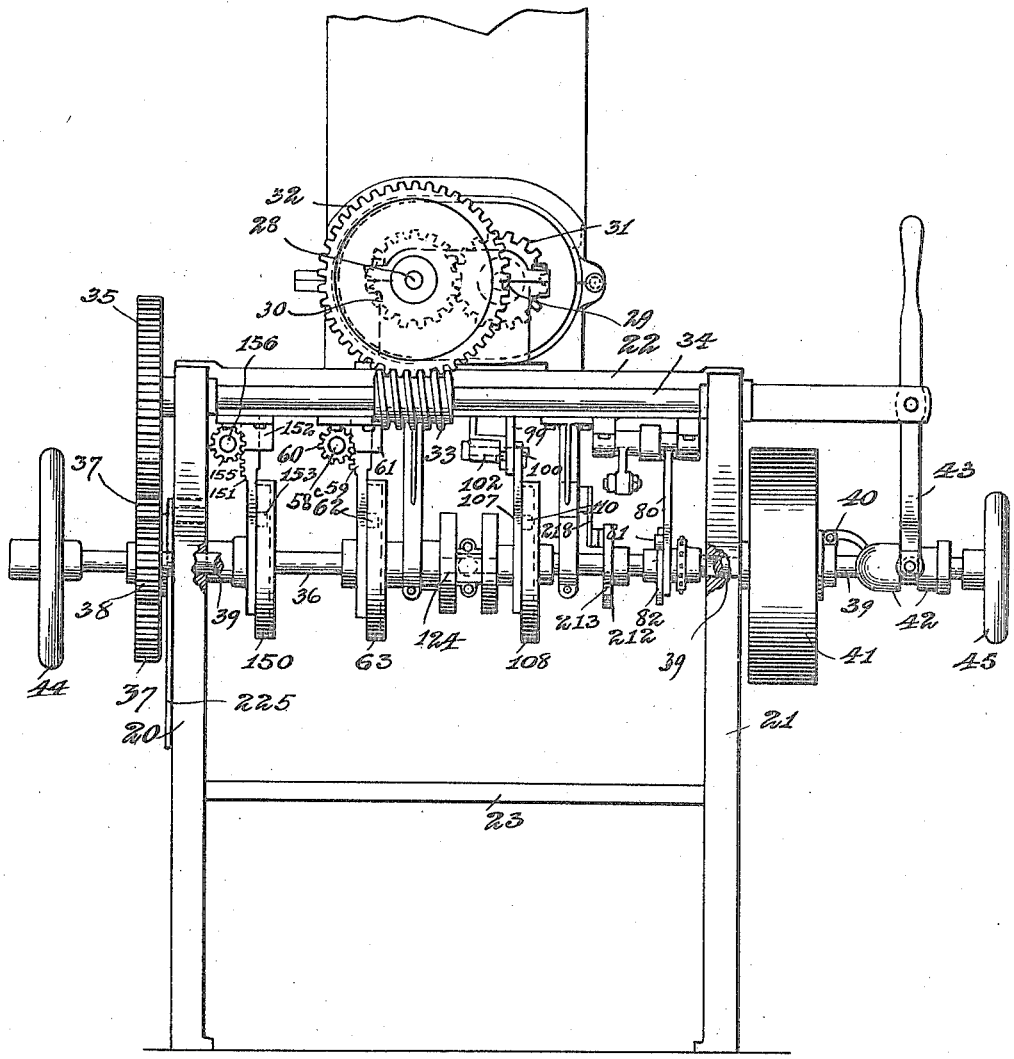
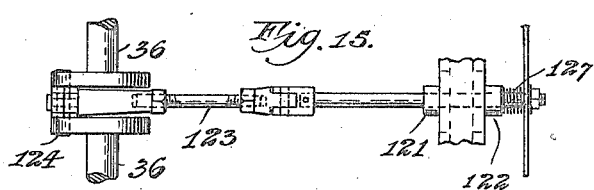

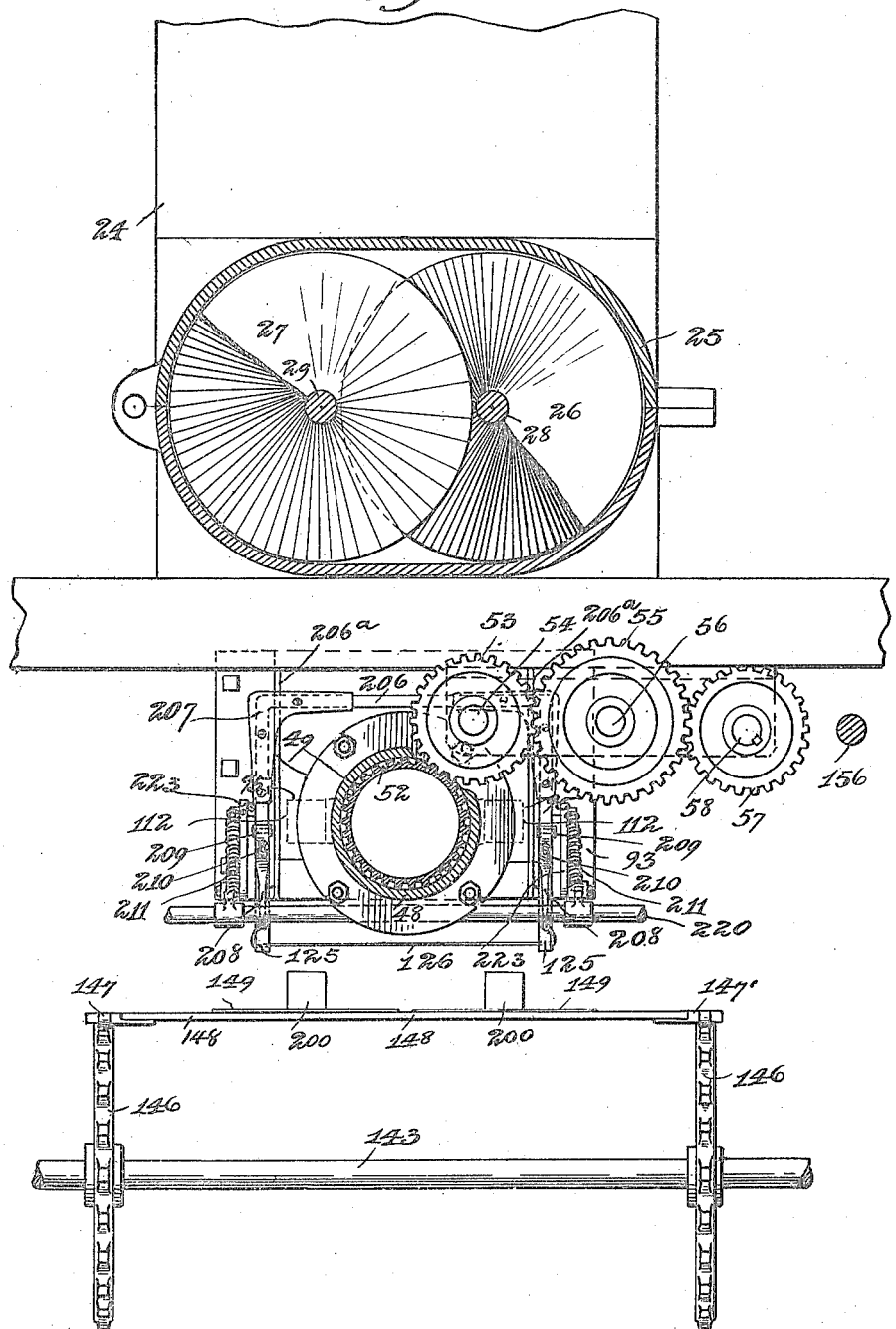

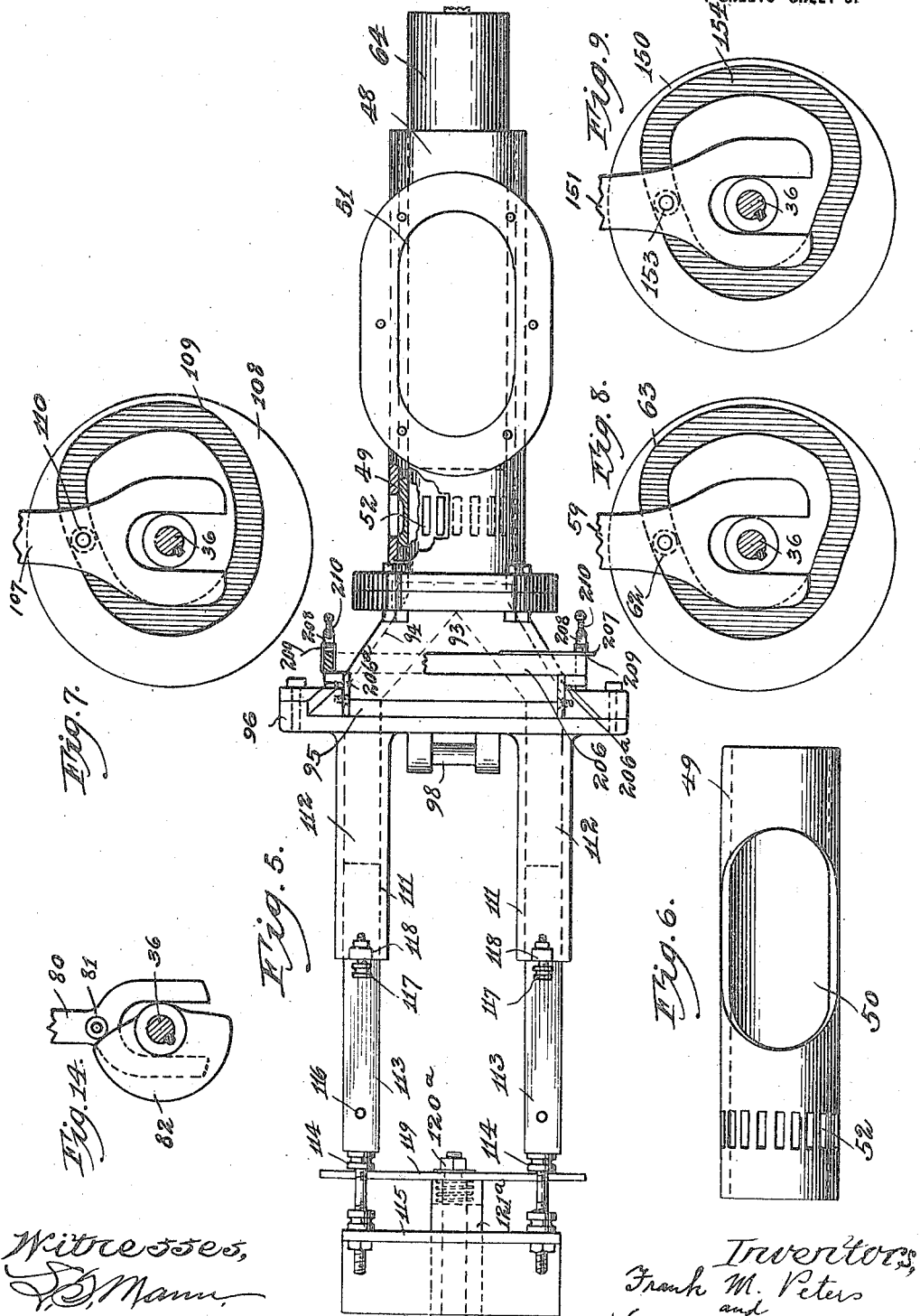

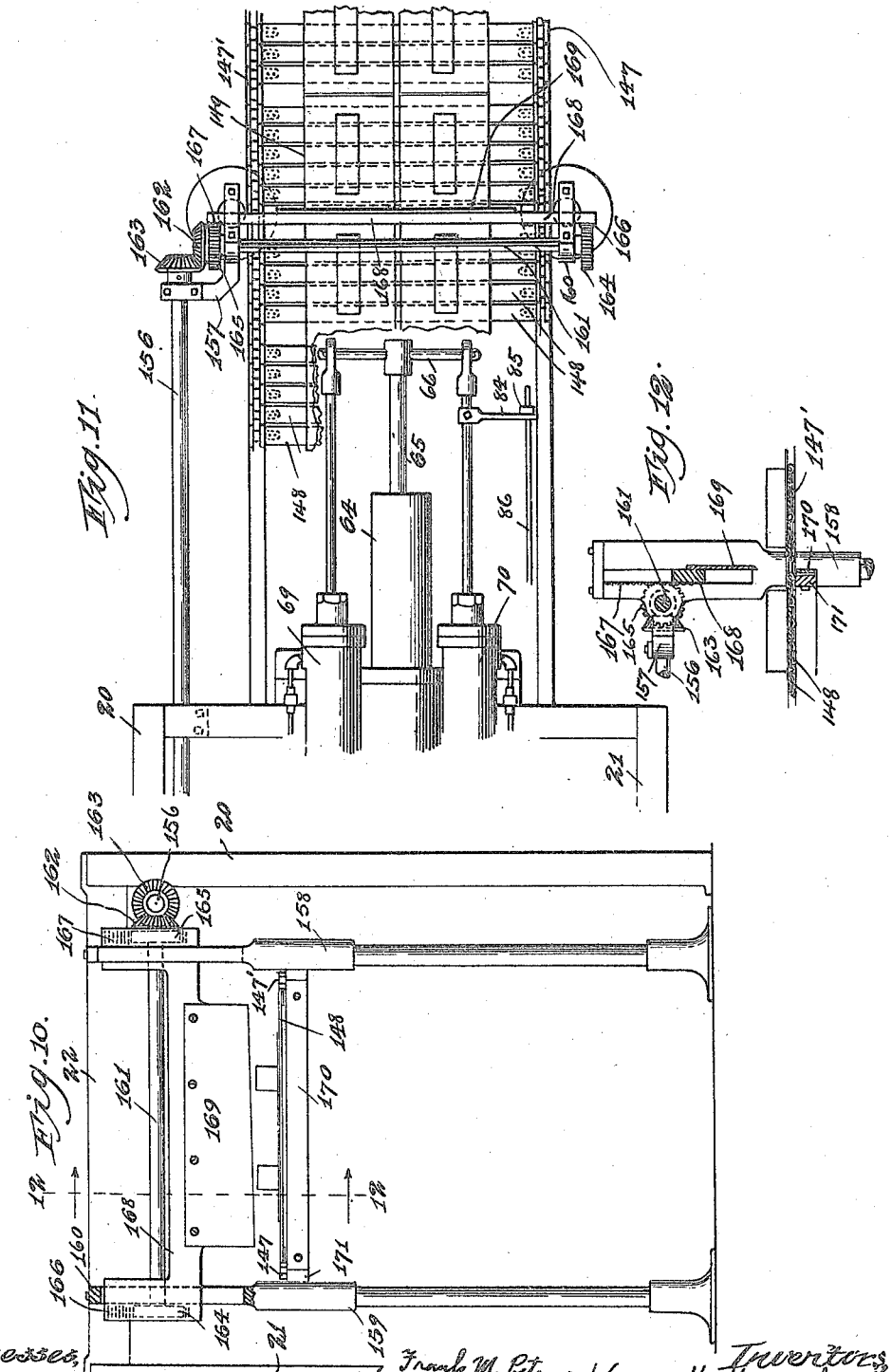

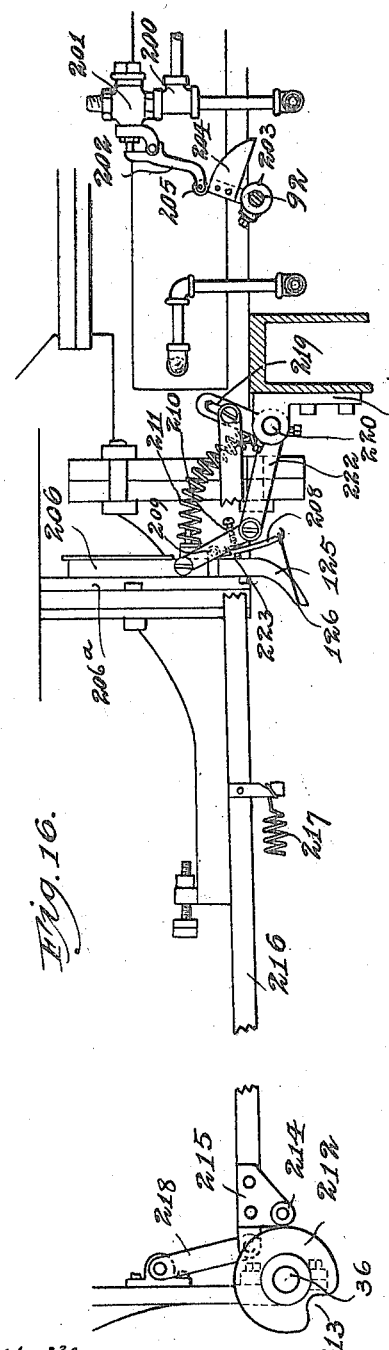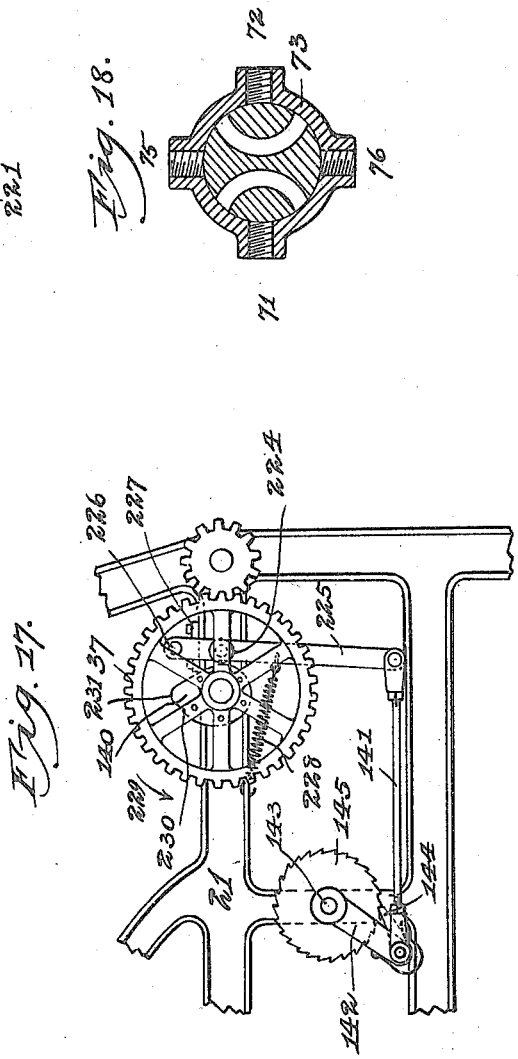

UNITED STATES PATENT OFFICE.

FRANK M. PETERS AND WARREN H. HUNGERFORD, OF CHICAGO, ILLINOIS; SAID HUNGERFORD ASSIGNOR TO SAID PETERS.

MACHINE FOR SUBDIVIDING PLASTIC SUBSTANCES.

1,257,523.  Specification of Letters Patent.  Patented Feb. 26, 1918.

Application filed August 5, 1915. Serial No. 43,874.

*To all whom it may concern:*

Be it known that we, FRANK M. PETERS and WARREN H. HUNGERFORD, both citizens of the United States, residing at Chicago, in the county of Cook and State of Illinois, have invented certain new and useful Improvements in Machines for Subdividing Plastic Substances, of which the following is a specification.

Our invention relates to improvements in machines for sub-dividing plastic substances, and is particularly adapted to machines for separating from a mass of butter, portions of substantially equal predetermined shape, weight, or volume.

Among the principal objects of the invention are, to provide a simple and efficient construction whereby the butter or other plastic substance may be rapidly and economically formed into portions of the desired weight, shape, or volume; to provide a construction by which the said portions are formed, delivered and prepared for inclosure in shipping receptacles without contact with human hands; to provide a machine which shall be simple and economical in construction and efficient in operation, and, in general, to provide a machine of the character referred to.

In the drawings accompanying this application, which illustrate a machine for automatically separating equal portions from a bulk supply of butter and delivering the said portions as forms deposited on parchment sheets which are intended for the inner wraps of the butter packages—

Figure 1 is a side elevation of the machine;

Fig. 2 is a plan view of the same;

Fig. 3 is an end elevation of Fig. 1, certain parts being omitted for the sake of clearness;

Fig. 4 is a section taken on the line 4—4 of Fig. 1, certain parts also being omitted for the sake of clearness;

Fig. 5 is a fragmentary plan view showing certain details of the butter dies;

Fig. 6 is a plan view of the rotary lining of the pressure chamber;

Figs. 7, 8 and 9 are fragmentary details of the cam mechanisms shown in elevation;

Fig. 10 is an elevation of the paper-cutting mechanism;

Fig. 11 is a plan view of Fig. 10;

Fig. 12 is a section taken on the line 12—12 of Fig. 10;

Fig. 13 is a fragmentary detail view of the valve linkage;

Fig. 14 is a fragmentary detail of the valve cam mechanism;

Fig. 15 is a fragmentary detail of the ejector mechanism;

Fig. 16 is a fragmentary elevation of the mechanism for actuating the butter-severing device, and other details;

Fig. 17 is a fragmentary side elevation of the rear of the machine showing the conveyer-actuating mechanism; and Fig. 18 is a section taken transversely through the four-way valve for controlling the ram.

Referring to the drawings, it will be seen that the operating parts of the machine are carried by a cast-iron frame composed of skeleton side members 20 and 21 connected by suitable cross-rails or ties as at 22 and 23. The butter is introduced into the machine by a chute or hopper 24. The lower end of said chute 24 opens into a conveyer chamber 25 in which revolve adjacent Archimedean screw propellers 26 and 27. Said screw propellers are constantly driven by means of shafts 28 and 29 connected together by spur gears 30 and 31, the shaft 28 having keyed to its outer projecting end a worm-wheel 32 driven by an intermeshing worm-gear 33 on the transverse shaft 34 journaled in the side frames of the machine. Said shaft 34 at one of its ends carries a spur gear 35 which is driven by the main or synchronized shaft 36 through a spur gear 37. The main shaft 36 is rotated by a spur pinion 38 meshing with the gear 37 and mounted on a third transverse shaft 39, which may be connected by means of a clutch mechanism 40 with a constantly rotating pulley 41 on said shaft. The main clutch 40 may be thrown into or out of engagement so as to connect or disconnect the pulley 41 by means of a clutch collar 42 which may be moved axially by a manually-operated clutch lever 43. The hand wheels 44 and 45 are for the purpose of turning over the machine by hand when making any necessary adjustments.

As shown in Figs. 1 and 2, the conveyer-chamber 25 at its delivery end has a hollow extension 46, the lower end of which faces downwardly and by means of a flange connection 47 communicates with the upper end of the pressure cylinder 48 (see also Fig 5). Within the pressure cylinder 48 we locate a cylindrical rotatable sleeve or liner 49 which is open at both ends and is apertured, as shown at 50, to correspond with the aperture 51 in the flange connection between the pressure cylinder and the conveyer-chamber. Adjacent its delivery end, the pressure cylinder 48 is cut away (see Figs. 4 and 5) so that a series of gear-teeth 52 cut in the periphery of the sleeve 49 may be engaged by a gear 53 journaled upon a fixed pin 54 and meshing with a gear 55. The gear 55 is mounted to rotate upon a pin 56 and meshes with and is driven by a gear 57 keyed to the end of the longitudinal shaft 58 journaled in fixed bearings mounted on the frame of the machine. The rear end of said short longitudinal shaft 58 (see Fig. 2) carries a gear $58^a$ which meshes with a gear $58^b$ on the end of a second longitudinal shaft $58^c$. Said shaft 58 is oscillated in proper timed relation by means of a reciprocable rack-bar 59, the teeth of which engage a spur pinion 60 keyed to the rear end of said shaft $58^c$. The upper end of said rack-bar 59 slides in a fixed housing 61, and the lower end thereof is forked to bridge the shaft 36. Reciprocatory motion is imparted to the rack-bar 59 by means of a cam roller 62 journaled upon a pin in the side of said rack-bar 59 and actuated by a cam 63 keyed to the main shaft 36.

The sleeve 49 provides a bearing for the longitudinal cylindrical ram or plunger 64 which is long enough to enter the pressure cylinder for a substantial distance. Said ram 64 is reciprocated in synchronism with the oscillation of the sleeve 49 by means of a stem 65 which is secured in a cross-piece 66 bridging and connected to the ends of rods 67 and 68 extending from pistons in the symmetrically disposed twin air cylinders 69 and 70. The outward movement of the ram 64 is effected by means of air admitted to the inner ends of said cylinders 69 and 70 by a pipe 71, and the inward movement of said ram is effected by air admitted to the outer ends of said cylinders by a pipe 72, both of said pipes leading to a control-valve 73. The details of the valve 73 need not be specifically described, it being sufficient to say that, as shown in Fig. 1, it is of the rotary type, mounted with its axis horizontal, and actuated by an arm or lever 74 keyed to the valve stem 92. When the lever 74 is moved in one direction, air under pressure enters the pipe 71 from the valve chamber which is connected with a supply of compressed air by a pipe 76; and the other pipe is placed in communication with the atmosphere by means of a vent or exhaust hole 75. When the lever 74 is moved in the reverse direction, the pipe 72 is placed in communication with the air under pressure and pipe 71 is exhausted.

The rocking lever 74 is actuated by a longitudinal rod 77 which extends to the rear of the machine and is pivoted to the depending arm 78 of a bell-crank lever, the horizontal limb of which 79 is connected to a pivoted vertical cam-rod 80. The lower end of said cam-rod 80 is forked to bridge and slide vertically upon the rotating shaft 36 and carries a pivoted cam-roll 81 which is engaged by a cam 82 keyed to the said shaft 36. As the shaft 36 rotates, the cam 82 actuates the cam-rod 80, the bell-crank lever, the longitudinal rod 77, and the lever 74 controlling the valve 73. When the cam-roll 82 is moved outwardly from the center of the shaft 36, the lever 74 is pushed forward, admitting air to the front end of the cylinders 69 and 70, thereby causing the ram 64 to move inwardly in the pressure cylinder 48. The rod 77 is normally retracted by means of a coil tension spring 83 having its rear end connected to a fixed part of the frame, and when the cam 82 continues its rotation it allows the cam-rod 80 to descend under the influence of said spring 83, which pulls the rod 77 rearwardly and actuates the rocking lever 74 in the reverse direction, exhausting the outer ends of the cylinders 69 and 70 and admitting air under pressure to the rear ends, causing the ram 64 to be withdrawn. In order to limit the outward movement of the ram 64, we secure on the piston rod 68 a finger 84 which, as the ram 64 and the pistons in the cylinders 69 and 70 move outwardly, strikes a block 85 secured on a rod 86 slidably mounted in the frame of the machine. Said rod 86, as shown in Fig. 13, carries a pin 87 disposed in the forked upper end 88 of a bell-crank lever 89 pivoted to a fixed part of the frame of the machine. The horizontal arm of said bell-crank lever 89 is connected by means of a pivoted link 90 with an arm 91 keyed to the stem 92 of the valve 73; hence, when the ram 64 is withdrawn far enough for the finger 84 to strike the tappet 85, the valve stem is rotated in a direction contrary to the direction of rotation imparted to it by the spring 83 and rod 77. The admission of compressed air to the rear or inner ends of the cylinders 69 and 70 is thus suspended and the outward movement of the ram is arrested.

Referring to Fig. 5, it will be seen that the inner end of the pressure cylinder 48 is flanged so as to connect with a flanged casting 93 having a pair of conduits 94 leading from the open end of the pressure chamber to a pair of symmetrically disposed apertures 95 in the rear face of said casting 93. The rear face of the casting 93 is vertical and is planed off, both on its face and as to its edges so as to accommodate a vertically-slidable cross-head 96. Said cross-head 96 is reciprocated vertically by means of a link 97 (see Fig. 1) pivoted to a pin 98 secured in a pair of lugs cast on the back of said cross-head member 96, the lower end of said short link 97 being pivotally connected to the front end of a horizontal, longitudinally extending lever 99 pivoted intermediate its length on a pin 100 fixed in a bracket 101 depending from one of the cross-rails forming a part of the machine frame. In order to furnish a better bearing, we secure to the side of the lever 99 a bent strap member 102 spaced apart from and parallel with the lever 99, and similarly apertured to pivot upon the fixed pin 100 (see Fig. 3). In order to relieve the actuating parts for the lever 99 of unnecessary work, the cross-head 96 and front end of the lever 99 are counter-weighted by means of a weight 103, which is connected to the lever 99 at 104 by means of a chain 105 passing over a pulley 106 rotatably mounted in the upper part of the machine frame. The rear end of the lever 99 is moved up and down in order to reciprocate the cross-head, by means of a cam-rod 107 having its upper end pivotally connected to the rear end of said lever 99, and having its lower part forked to bridge the shaft 36. Motion is imparted to the cam-rod 107 by means of a cam 108 keyed to the shaft 36 and having therein a groove 109 in which runs a cam-roll 110 pivoted to the side of the cam-rod 107. (See Fig. 7).

Upon the rear face of the cross-head 96 there are integrally cast a pair of symmetrically disposed, rearwardly-projecting receptacles 111 which are square in section and in the proper location to be opposite or in register with the apertures 95 in the cylinder head 93 when the cross-head 96 is in its uppermost position. The receptacles 111 are broached out internally so as to provide longitudinally extending cavities 112, in the present case square in section, as are the apertures 95. The cavities 112 extend entirely through the receptacles 111, the ends thereof being open, and in the rear ends of said cavities are located a pair of plungers 113 made square in section to fit within said cavities. These plungers 113 are not connected to any other moving or stationary part of the machine, but simply slide in and out the receptacles 111. When the cross-head 96 is in its topmost position with the cavities 112 in register with the apertures 95, the rear ends of the plungers 113 are opposite a pair of adjustable headed screws 114 mounted in a bracket 115 (see also Fig. 1), which is supported by a cross-rail forming part of the frame of the machine. The rear ends of the plungers 113 are also equipped, as to their upper faces, with a pair of upwardly-projecting pins 116 (see also Fig. 1) which, when the plungers 113 are forced into the cavities, strike against a pair of adjustable headed screws 117 threaded into a pair of lugs 118 projecting upwardly from the rear ends of the receptacles 111. Immediately below the heads of the screws 114 is located a transverse ejector plate 119, having its working face vertical and adapted to engage the rear ends of the plungers 113 when the cross-head 96 is lowered. The ejector plate 119 is carried slidably on the end of a rod 120 which slides in mountings 121 and 122 supported by the frame of the machine. Its outward movement is limited by a nut $120^a$ and it is held at right-angles and prevented from turning by a guide-bar $121^a$ secured to the upper part of the plate and sliding in a groove between the bracket 115 and the cross-rail upon which said bracket is mounted. To the rear end of said rod 120 is pivotally connected a pitman 123, the rear end of which is journaled on the crank 124, the latter being part of the shaft 36 (see Fig. 15).

Assuming that the machine is being supplied with butter and is turning out butter-forms, the operation will be as follows: The rotation of the worms 26 and 27 forces the butter into the extension 46 and thence into the pressure cylinder 48 through the oval apertures in the upper side of said pressure cylinder 48 and in the rotary sleeve 49, assuming the said sleeve to be in such position that the two apertures are in register. As the shaft 36 rotates, the sleeve 49 is rotated through the gearing 53, 55, 57, 60, 59, cam-roll 62, and cam 63. During the time the butter is being admitted to the pressure cylinder 48 under the influence of the conveyer screws 26 and 27 through the opening 50 in the sleeve 49, the ram 64 is withdrawn from the pressure chamber 48 by means of air under pressure admitted to the inner ends of the cylinders 69 and 70 by the valve 73 which has been previously actuated by the rod 77 through the cam 82 and intermediate mechanism. The withdrawal of the ram tends to create a vacuum in the chamber 48, thereby sucking the butter into the chamber and assisting the worm conveyers 26 and 27. As soon, however, as the sleeve rotates sufficiently to close the aperture 50 and prevent further admission of butter to the pressure chamber, the cam 82 engages the cam-roll 81, and through the cam-rod 80, bell-cranks 78 and 79, rod 77 and arm 74, rotates the valve stem 92, exhausting the inner ends of said cylinders 69 and 70 and admitting air under pressure to the outer ends, thus causing the ram to be thrust into the pressure chamber 48 with great force.

The sizes of the cylinders 69 and 70 compared with the area of the cross section of the ram 64, and the air pressure supplied to said cylinders, are all suitably arranged so that the butter is subjected to a pressure sufficient to insure uniformity in the size and weight of the forms. Under the influence of the pressure imparted by the ram 64, the butter passes out of the rear end of the cylinder into the cylinder head casting 93 where it divides and enters the cavities 112 through the conduits 94 and apertures 95, the cross-head then being in its uppermost position. Under the influence of the butter entering the cavities 112, the plungers 113 are forced back until they finally strike the heads of the screws 114, thus filling the cavities. It will be observed that the formation of air pockets in the cavities of the receptacles is absolutely prevented by virtue of the fact that the cavities are filled by the pressure of the butter which forces out the plungers and thus makes room for itself in the receptacles up to an amount equal to the capacities of the cavities. Shortly after the receptacles 111 have been filled by the inward movement of the ram 64, as just described, the cross-head 96 is caused to descend by the rotation of the cam 108 which actuates the lever 99 through the cam-rod 107 and roll 110.

After the cross-head has descended a sufficient distance to throw the ends of the cavities 112 out of register with the apertures 95, the butter, which may be still under some pressure, is prevented from escaping from the cylinder-head 93 by the smooth face of the cross-head 96 sliding past. It is manifest that the action of the sliding cross-head 96, in conjunction with the edges of the apertures 95, in effect shears the butter-connection between the cavities 112 and conduits 94, so that the quantity of butter remaining in each cavity 112 after the cross-head has descended between said cavity and said aperture 95, is equal to its cubical content, with the plunger 113 in its rearmost position.

The butter, when it is being forced into the receptacles 111 by means of the ram 64, is under considerable pressure. In order to substantially relieve the pressure of the butter before the receptacle cavities lose register with the openings 95, we provide an escape valve for allowing the air in the end of the cylinders 69 and 70 to escape, thereby placing the inner and outer ends of said cylinders under atmospheric pressure only and taking the thrust off the ram. This is effected by means of a small escape valve or whistle valve, illustrated in Fig. 16. In the pipe 72 leading from the valve 73 to the outer ends of the cylinders 69 and 70 is a T connection 200 on which is mounted a whistle valve 201 actuated by a lever 202. To the stem 92 of the valve we secure an arm 203 carrying a cam 204 which coöperates with the cam-roll 205 to actuate the lever 202 and open the whistle valve when the stem 92 is rocked into such position that the valve 73 is in its central position, as shown in Fig. 18.

When the cross-head 96 has descended a sufficient distance, the ejector plate 119 advances under the influence of the rod 120, the pitman 123, and crank 124, and engages the rear ends of the plungers 113, which are thus thrust forward into the cavities 112 and discharge the butter, the front open ends of the cavities having been exposed below the bottom edges of the lips of gates 95 by the descent of the cross-head. Inward movement of the plungers 113 is regulated by the screws 117, so that when the plungers have been forced into their inmost position, the desired predetermined quantities of butter have been expelled from the cavities. It is manifest that the shape of the butter forms delivered upon the outward movement of said plungers is determined by the shape of the entrances to the cavities in the receptacles. In practice, we prefer to sever the butter forms on the outside of the cavity openings or die apertures, after the inward movements of the plungers, by means of a horizontal cutting wire 126 which extends across a pair of supports 125. Said parts 125 are the curved lower ends of a vertically reciprocable frame 206 which is guided by the plates 206ª mounted on the sides of the casting 93 (see Fig. 5). Said frame, which is preferably formed of a flat bar of steel bent into U-shape, is preferably strengthened at its corners by means of a pair of angle-plates 207. The wire 126 is maintained taut by securing the ends thereof to a pair of levers 208 which are pivoted on the sliding frame 206, as shown at 209, and are forced outwardly away from said supports 125 by means of adjusting screws 210. The slide piece 206 is maintained in close fitting sliding engagement with the extension piece 93 by means of two coil compression springs 211.

The wire 126 is reciprocated with the slide piece 206 by the following mechanism: Referring to Figs. 1, 2, 3 and 16, the main shaft 36 is keyed to the cam 212, which is concentric for the greater portion of its circumference, but at one point is cut out to form a notch 213. On the surface of said cam runs a cam-roll 214 journaled on a small bracket 215 depending from a thrust-bar 216 extending longitudinally of the machine. Said thrust-bar is pulled toward the cam by a spring 217, the cam end of the thrust-bar being hung from a pivoted link 218. The other end of said bar is pivotally connected to a slotted arm 219 keyed to a rock shaft 220 journaled in brackets 221 secured to one end of the cross-rails of the machine. To said shaft 220 is also keyed an arm 222, the outer end of which is connected to the slide-piece 206 by means of a pivoted link 223. It is manifest that when the shaft 36 rotates and the roll 214 enters the notch 213, the thrust-bar will undergo a sudden longitudinal movement, rocking the shaft 220 and causing the slide-piece 206 to drop quickly, moving the wire 126 downwardly across the faces of the die apertures, severing the butter forms therefrom.

Referring to Figs. 1 and 2, at the rear end of the machine we bolt upon the ends of the side frames a pair of extension brackets 128 in which is journaled a shaft 129 driven by means of a chain 130 and sprocket-wheels 131 and 132 from the main shaft 36. Above the shaft 129 the brackets 128 are extended upwardly so as to furnish pairs of forks 133 spaced apart the proper distance to loosely admit the paper-roll shaft 134. On said paper-roll shaft 134 revolve loosely a pair of rolls 135 of parchment suitable for the inner wrap of the butter package. The paper rolls 135 are supported by and rest directly upon a roller 136 of such diameter as to impart to the surface 137 of the paper rolls a linear velocity equal to the average speed of the intermittent paper feed mechanism, designated as a whole 138. In order to compensate for the intermittent character of the feed of the paper through the machine and for slight inaccuracies, a substantial length of the paper is drawn off the rolls 135 so as to hang down in a pair of loops 139.

Referring to Figs. 1, 2 and 17, to the inner side face of the gear 37 there is secured a circumferential cam 140 which is engaged by a cam-roll 224. Said cam-roll 224 is rotatably mounted intermediate the ends of a depending lever 225 which is pivotally hung at 226 from a bracket 227 mounted on one of the side frames of the machine. The cam-roll 224 is maintained in engagement with the surface of the cam 140 by a coil spring 228 connected between the side frame of the machine and said pivoted lever 225. The lower end of said lever 225 is pivotally connected by means of an adjustable connecting rod 141 with the lower end of an arm 142 journaled in the side frames of the machine. The end of said lever 142 also carries a pivoted spring-pressed pawl 144 which is arranged to engage and rotate a ratchet wheel 145 keyed to said shaft 143. Upon said transverse shaft 143 are keyed a pair of sprocket-wheels 146 (see Fig. 4) around which are trained chains 147 and 147', the opposite links of said chains being connected by wooden slats 148 (see Fig. 11). The carrier composed of said chains and slats extends from under the machine, as shown in Figs. 1 and 11, and leads to any point where it is desired to convey the butter forms, where said carrier is trained around a set of idler sprockets similar to sprockets 146. The paper, which is fed from the paper-rolls 135 by means of the constantly rotating supporting roller 136, passes to and rests upon the top of the slats 148, as shown most clearly in Figs. 4 and 11 at 149, the height and speed of the carrier being adjusted so that the butter forms as they are delivered from the receptacles 111 by the ejector plungers 113, are received, supported, and conveyed away by the carrier at substantially the same speed as the butter leaves the mold. It is understood, of course, that the ejector crank 124 and the cam 140 are suitably synchronized so that the ejector and carrier move forward substantially in unison. A moment's consideration will show that it is of great importance to support and convey the butter from the mold at substantially the same speed as it is being ejected, for the reason that the butter may be quite soft and might otherwise bend or lose its proper shape. The weight of the butter forms resting upon the strips of paper supported by the carrier is sufficient to maintain the paper in contact therewith without other mechanism provided for that purpose.

Examination of the cam 140, which, with the shaft 36, rotates in the direction of the arrow 229, will disclose that it is formed with a small portion 230 of its circumference concentric with its center of rotation, so that there will be a slight dwell in the movement of the ratchet wheel 145. This dwell in the movement of the conveyer is timed to take place during the time that the wire 126 is being moved downwardly by the slide 206, so that when the wire is in the act of severing the butter form from in front of the die apertures in the receptacles 111, the butter forms are stationary. As soon, however, as the wire 126 passes through the butter, thereby severing the forms, and reaches its downward limit of movement, the portion 231 of the cam 140 engages the roll 224 and moves forward the conveyer a short distance, sufficient to free the severed back edges of the butter forms from contact with the wire 126 when the latter ascends to its normal position. After the deposited forms of butter have been advanced a sufficient distance by the carrier, the strips of paper are cut intermediate the prints so as to constitute separate sheets, one for each form. This is accomplished by the mechanism illustrated in Figs. 10, 11 and 12.

Referring to Figs. 2 and 3, it will be observed that the shaft 36 carries a cam 150 somewhat similar to the cam 63 and arranged to actuate a vertically reciprocable rack bar 151 arranged to slide in a fixed housing 152 and having its lower end forked to bridge and slide upon said shaft 36, the actuating connection being a cam roll 153 which travels in a groove 154. In mesh with said rack bar 151 is a spur pinion 155 which is keyed upon the end of a longitudinal shaft 156 suitably journaled in the frame of the machine, extending the entire length thereof and projecting toward the front. as shown in Fig. 11. The outer projecting end of said shaft 156 is journaled in a bracket 157 secured on the upper end of a floor standard 158. Upon the upper end of the floor standard 159 is a somewhat similar bracket 160, and in said brackets 157 and 160 is journaled a transverse shaft 161 to which is keyed a bevel pinion 162 meshing with a bevel pinion 163 geared to the projecting end of the longitudinal shaft 156. To said shaft 161 are also keyed a pair of spur pinions 164 and 165 which engage rack members 166 and 167 which slide in a pair of vertical slots cut in the upper ends of the floor members 158 and 159, and are connected by and form a part of an integral cross member 168. To the lower end of said cross member 168 is secured a knife 169 which coöperates with a stationary knife 170 secured to a rail 171 connecting the members 158 and 159. The chains 147 and 147' are supported by and slide upon the upper surface of the cross rail 171. The operation of the severing mechanism is very simple. During the period of rest of the carrier, that is to say, while the pawl 144 is being retracted, the cam 150 actuates the rack bar 151 and rotates the shaft 156 through the pinion 155. Said shaft 156, by means of the gears 163 and 162, rotates the shaft 161, and the pinions 164 and 165 cause the rack bars 166 and 167 to descend in their guides and drop the knife 169 so that the latter, in conjunction with the stationary knife 170, severs both strips of paper intermediate the pairs of forms of butter. In order to make room for the knife 169 in its descent to sever the paper, we leave out every sixth carrier slat, the carrier being suitably synchronized so that the butter forms are deposited over the groups of five slats between the openings in the carrier, and also said openings are located directly beneath the knife during the period of quiescence of the carrier. The individual forms of butter, each resting on its individual sheet of paper cut off from the strip by the severing mechanism, are conveyed by the carrier to any approved wrapping mechanism, or they may be removed from the carrier and wrapped and packaged manually.

Although we have described a machine which is particularly adapted for producing equal portions of butter, it should be understood that the invention is not necessarily confined to use in connection with machines in which butter is operated upon. It will also be manifest to those skilled in the art that the shapes, sizes, weights, and number of forms produced by the machine may be readily changed from those described.

As to the expression "prismatic" which appears in the claims in the absence of a better dictionary word, said word we define as including a cylinder or any other straight-sided shape of uniform cross section throughout its length and whatever the shape of the cross section may be.

Although we have described what we consider to be a preferred embodiment of our invention, it should be understood that many of the details of the machine described may be modified considerably without sacrificing the benefits or advantages of the invention; therefore, we do not desire the scope of our invention to be limited, except as specified in the appended claims.

We claim—

1. In a machine of the class described, the combination of a pressure chamber provided with a delivery port and an inlet port, means for alternately opening and closing the delivery port and the inlet port, and intermittently operating means synchronized with the opening and closing means for exerting pressure on a plastic substance contained within said chamber when the inlet port is closed and the delivery port is open.

2. In a machine of the class described, the combination of a pressure chamber provided with a delivery port and an inlet port, means for alternately opening and closing the delivery port and the inlet port, measuring means associated with said delivery port, and intermittently operating means synchronized with the opening and closing means for exerting pressure on a plastic substance contained within said chamber when the inlet port is closed and the delivery port is open, and coöperating with said measuring means.

3. In a machine of the class described, the combination of a pressure chamber provided with a delivery port and an inlet port, means for alternately opening and closing the delivery port and the inlet port, measuring means associated with the delivery port, and intermittently operating means for reducing the cubical content of said chamber synchronized with the opening and closing means for exerting pressure upon a plastic substance contained within said chamber when the delivery port is open and the inlet port is closed.

4. In a machine of the class described, the combination of a pressure chamber provided with a delivery port and an inlet port, means for alternately opening and closing the delivery port and the inlet port, a ram projecting into said chamber, means for measuring material forced out of said chamber, and synchronized means for thrusting the ram into the chamber to exert pressure upon a plastic substance contained within said chamber when the delivery port is open and the inlet port is closed.

5. In a machine of the class described, the combination of a receptacle having an outlet, a plunger of substantially uniform cross section extending from outside into said receptacle and slidably mounted therein, means for positively limiting the inward and outward movement of said plunger, means for forcing a plastic substance into said receptacle and moving said plunger from its inner to its outer position to admit a predetermined quantity of plastic material into said receptacle, means for forcing said plunger back into its inner position to expel through said orifice the plastic substance in an amount equal to the amount forced into said receptacle, and a reciprocatory cutting member adapted to execute a transverse severing movement outside of said orifice after said predetermined quantity has been extruded therefrom by the movement of said plunger from its outer to its inner position.

6. In a butter sub-dividing machine, the combination of a pressure chamber provided with a discharge port and an inlet port, means for closing said chamber except as to the discharge port, a receptacle arranged to be placed in communication with said pressure chamber through said discharge port while said chamber is so closed, means for bringing said receptacle into and out of communication with said pressure chamber, means for discharging the receptacle charge, and an Archimedean screw forcible feeding mechanism arranged to deliver butter into said pressure chamber through said inlet port.

7. In a machine of the class described, the combination of a chamber, means for subjecting a plastic substance to pressure in said chamber, said chamber having a discharge port, means for closing said chamber, a receptacle having an inlet aperture and a smooth face adjacent said aperture, means for moving said receptacle alternately into such position that the inlet aperture is in register with the outlet port of said chamber whereby the receptacle is filled, and into position where said face constitutes a seal for said chamber and said inlet aperture is exposed, and means for discharging a predetermined quantity of said substance less than the total capacity of the receptacle from said receptacle through said inlet aperture while in said second position.

8. In a machine of the class described, the combination of a pressure chamber provided with an outlet port and an inlet port, a receptacle arranged to be placed in communication with said pressure chamber through said outlet port, pressure means, means for sealing the inlet during the operation of said pressure means, means for bringing said receptacle into and out of communication with said pressure chamber, means for discharging the receptacle charge, and forcible feeding means for maintaining a supply of plastic material in said pressure chamber.

9. In a machine of the class described, the combination of a pressure chamber provided with a plane surface in which is an outlet port, means for subjecting a plastic substance to pressure in said chamber whereby the substance may be forced through said aperture, automatic means for maintaining a supply of the material within said chamber, means for closing the chamber against said supply means while said substance is under pressure in said chamber, a receptacle provided with an inlet port and a longitudinal cavity extending substantially at right angles from the plane of the outlet port of said chamber, said receptacle having a face adjacent its inlet aperture and maintained in sliding engagement with the outlet port of said pressure chamber, means for alternately moving said receptacle into and out of register with said outlet port, the said face constituting a seal for said chamber, and having its inlet aperture exposed while in said latter position, a plunger adapted to reciprocate in said cavity to expel a definite quantity of the plastic material maintained therein, and means positively synchronized with the movement of said receptacle for positively urging said plunger toward the inlet aperture while said receptacle is in its latter position.

10. In a machine of the class described, the combination of a pressure chamber provided with a plane surface in which is an outlet port, intermittently operating means for subjecting a plastic substance to pressure in said chamber whereby the substance may be forced through said aperture, continuously operating twin worm mechanism for forcing material into said chamber, a receptacle provided with an inlet port and a longitudinal cavity extending at right angles from the plane of the outlet port of said chamber and having a cross section at least as large as the cross section of said inlet port, said receptacle having a face adjacent its inlet aperture and maintained in sliding engagement with the outlet port of said pressure chamber, means for alternately moving said receptacle into and out of register with said outlet port, the said face constituting a seal for said chamber and having its inlet aperture exposed while in said latter position, a plunger substantially of the same cross section as said cavity and adapted to reciprocate therein to expel the contents, and means synchronized with the movement of said receptacle for positively urging said plunger toward the inlet aperture while said receptacle is in its latter position.

11. In a machine of the class described, the combination of a chamber having a delivery orifice provided with a plane surface surrounding the same, means for forcing a plastic substance through said orifice, a receptacle having a working face in sliding engagement with said plane surface and provided with a cavity of substantially uniform cross section throughout its length with an inlet aperture in said working face, a plunger loosely mounted in said cavity, a stop for said plunger to resist its outward movement when the receptacle is filled, means for moving said receptacle into and out of register with said delivery orifice, means for positively reciprocating said plunger a predetermined distance to discharge a definite proportion of the contents of said receptacle at suitable synchronized intervals, and means for severing the discharged portion from the undischarged portion.

12. In a machine of the class described, the combination of a pressure chamber provided with a delivery port and an inlet port, means for alternately opening and closing the delivery port and the inlet port, forcible feeding means for conducting a supply of plastic substance to said inlet port whereby the supply of plastic material in said pressure chamber may be replenished when the inlet port is open and the delivery port is closed, a ram projecting within said chamber, means for thrusting the ram into the chamber to exert pressure upon the substance therein when the delivery port is open and the inlet port is closed, and means for operating said parts automatically in unison.

13. In a machine of the class described, the combination of a pressure cylinder provided with an inlet and an outlet port, a sleeve rotatable within said cylinder and having an inlet opening adapted to register with the inlet port while said sleeve is in a certain position in said cylinder, a receptacle, means for alternately sealing said outlet port and bringing said receptacle into register therewith, synchronized means for rotating said sleeve to seal the inlet port when the receptacle is brought into register with said outlet port, and synchronized means for exerting pressure on a plastic substance contained within said cylinder during the time that said inlet port is closed and said outlet port is in communication with the receptacle.

14. In a machine of the class described, the combination of a pressure chamber having a cylindrical portion and provided with an inlet and an outlet port, a sleeve rotatable within said cylindrical portion and having an inlet opening in its side adapted to register with the inlet port in said chamber when said sleeve is rotated into a definite position in said cylinder, a receptacle adapted to receive a predetermined quantity of plastic material from said chamber through said outlet port, means for alternately sealing said outlet port and bringing said receptacle into communication therewith, synchronized mechanism for rotating said sleeve to seal the inlet port when the receptacle is brought into communication with said outlet port, a ram projecting within said cylinder, and means synchronized with the sleeve-rotating means for reciprocating said ram in said cylinder to exert pressure on a plastic substance contained within said cylinder during the time that said inlet port is closed and while said receptacle is in communication with said outlet port.

15. In a machine of the class described, the combination of a pressure cylinder provided with an inlet and an outlet port, a sleeve rotatable within said cylinder and having an inlet opening adapted to register with the inlet port while said sleeve is in a certain position in said cylinder, a receptacle of definite capacity, means for alternating sealing said outlet port and bringing said receptacle into register therewith, synchronized means for rotating said sleeve to seal the inlet port when the receptacle is brought into register with said outlet port, a ram projecting axially into said cylinder, pressure means for conducting a supply of plastic substance to said inlet port, and means for axially advancing said ram into said cylinder when said inlet port is closed and while said outlet port is in communication with said receptacle.

16. The combination with a conveyer having a carrying face moving substantially in a horizontal plane, a receptacle and means for filling said receptacle with a plastic substance, means for moving said receptacle from its receiving position into a position to deliver the substance onto the carrying face of the conveyer, and means operative when the receptacle is so moved to discharge the substance onto the conveyer in the line of movement of the carrying face and at substantially the same rate.

17. The combination with a conveyer having a carrying face moving substantially in a horizontal plane, a receptacle, means for forcing plastic substance into said receptacle in a direction parallel with but opposed to the direction of movement of said conveyer when said receptacle is in a position remote from said conveyer, means for moving said receptacle transversely into a position adjacent the conveyer to deliver the substance onto the carrying face of the conveyer, and means operative when the receptacle is so moved to discharge the substance onto the conveyer in the line of movement of the carrying face and at substantially the same rate of speed.

18. In a machine of the class described, the combination of a pressure chamber provided with a delivery port and an inlet port, a receptacle arranged to be placed in connection with said pressure chamber through said delivery port, means for alternately opening and closing the delivery port and the inlet port, means for exerting pressure on a plastic substance contained within said chamber when the inlet port is closed and the delivery port is open, and means for relieving the pressure in said chamber while the delivery port is still open.

19. In a machine of the class described, the combination of a pressure chamber provided with a delivery port and an inlet port, means for alternately opening and closing the delivery port and the inlet port, a receptacle, means for placing said receptacle into and out of communication with the delivery port of said chamber, a ram projecting into said chamber, synchronized means for thrusting the ram into the chamber to exert pressure upon a plastic substance contained within said chamber when the delivery port is open and the inlet port is closed, and automatic means for taking the thrust off said ram while the delivery port is still open.

20. In a machine of the class described, the combination of a pressure chamber provided with a delivery port, a receptacle, means for alternately sealing said delivery port and bringing said receptacle into register therewith, and resilient pressure means for exerting pressure on a plastic substance contained within said chamber when the delivery port is open, whereby said receptacle is filled.

21. In a machine of the class described, the combination of a pressure chamber provided with a delivery port and an inlet port, means for alternately opening and closing the delivery port, a receptacle, movable, to be brought into and out of communication with said delivery port, a ram projecting into said chamber, and synchronized resilient means for thrusting the ram into the chamber to exert pressure upon a plastic substance contained within said chamber when the delivery port is open and the inlet port is closed, whereby the receptacle is filled, said thrusting means being rendered ineffective prior to the closure of said delivery port whereby pressure of the plastic substance forced into said receptacle is relieved.

22. In a machine of the class described, the combination of a pressure chamber provided with an inlet and an outlet port, means for alternately opening and closing the inlet and the outlet port, resilient means for exerting pressure on a plastic substance contained within said chamber during the time that the inlet port is closed and the outlet port is open, a receptacle, means for bringing said receptacle into register with said outlet port when said outlet port is open whereby the receptacle is filled, a plunger adapted to reciprocate within said receptacle for discharging the contents, and means for positively reciprocating said plunger to discharge the contents when the receptacle is not in register with said outlet port, said pressure means being rendered ineffective prior to the closure of said inlet port.

FRANK M. PETERS.
WARREN H. HUNGERFORD.

Witnesses:
ALBERT H. GRAVES,
EMILIE ROSE.